Nov. 13, 1962 R. L. BLACK, JR 3,063,874
FILTER CLEANING SYSTEM FOR TEXTILE TRAVELING SUCTION CLEANER
Filed April 24, 1961
2 Sheets-Sheet 1
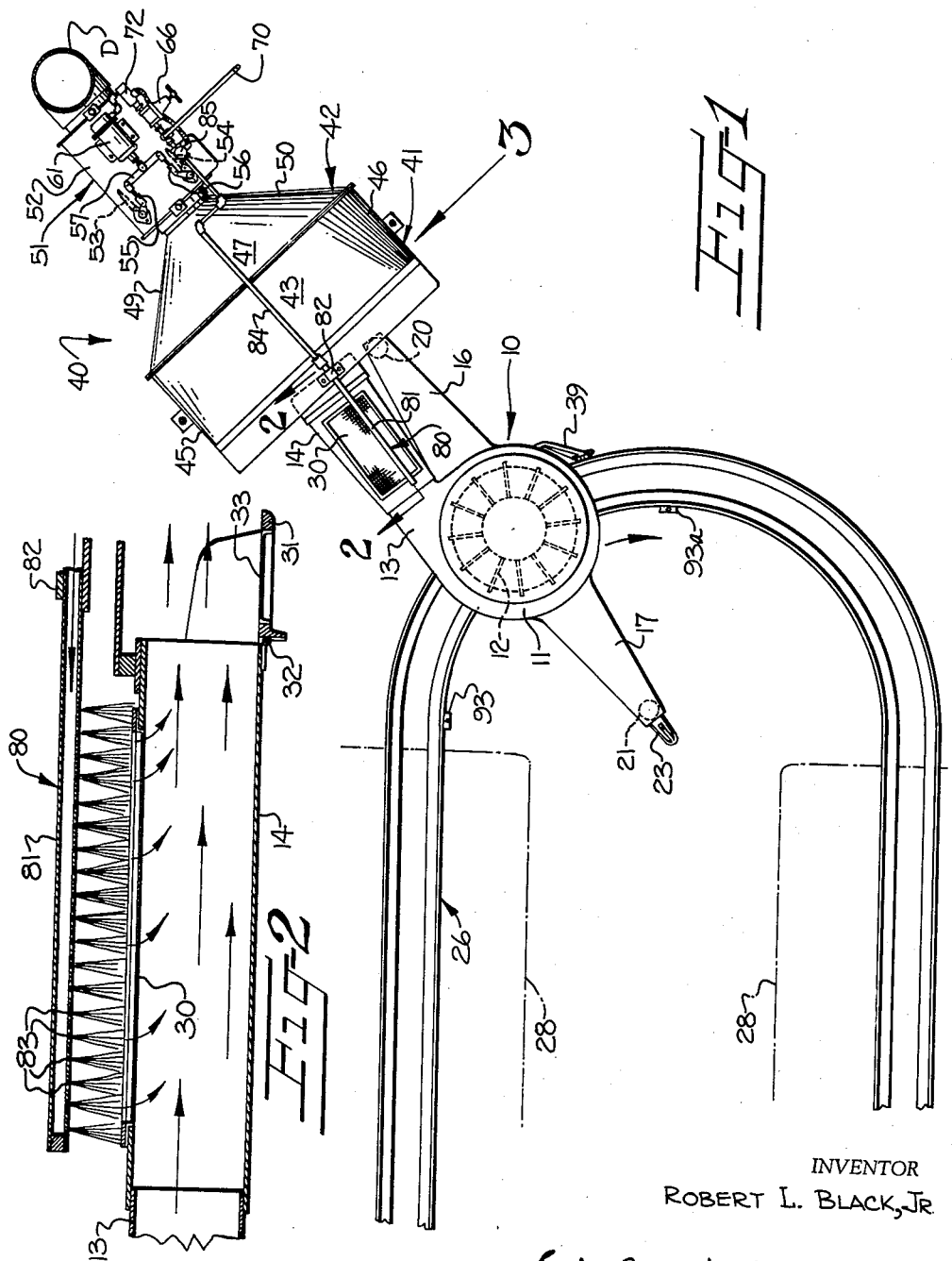
INVENTOR
ROBERT L. BLACK, JR.
BY Eaton, Bell, Hunt & Deltzer
ATTORNEYS

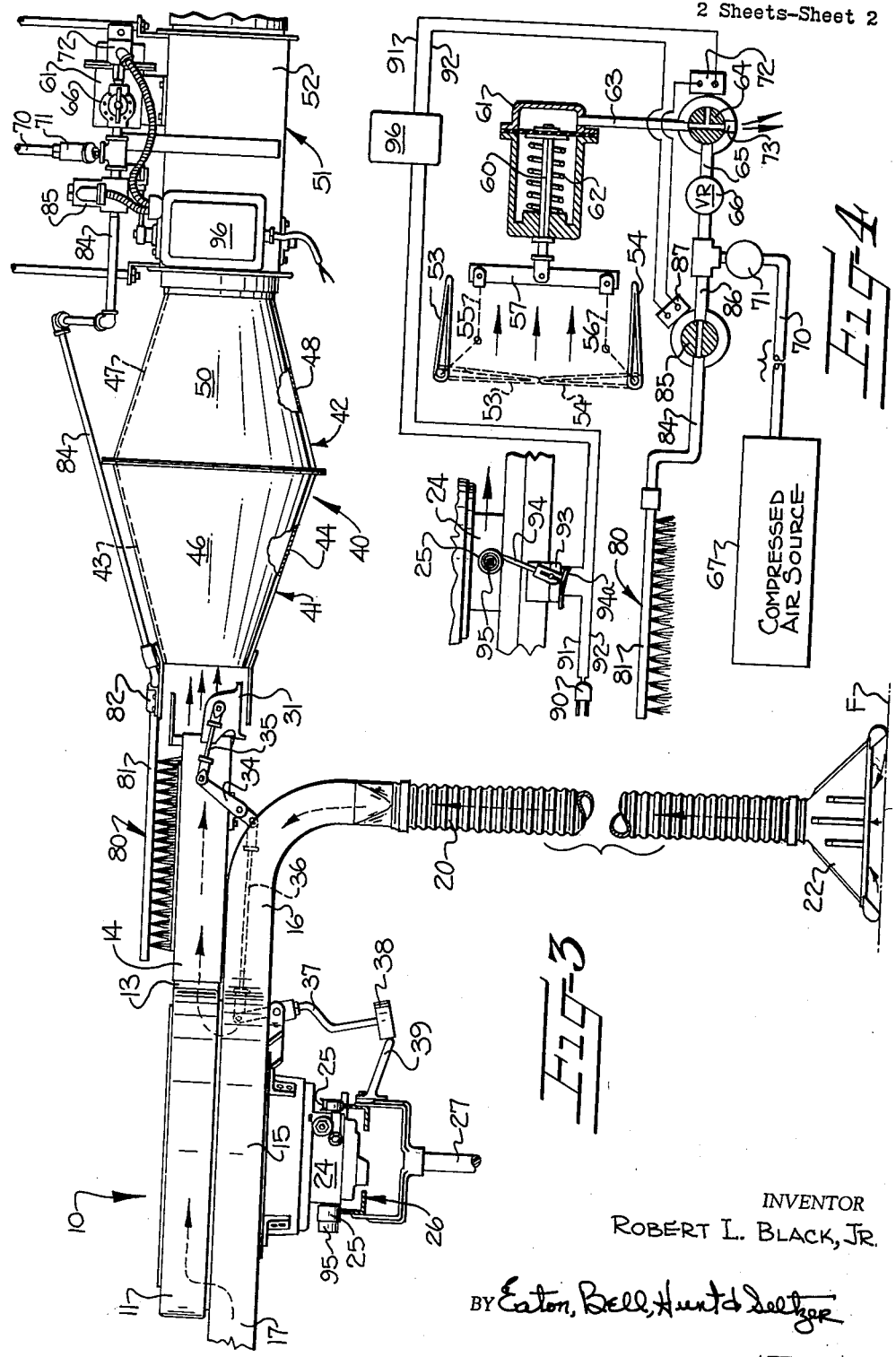

United States Patent Office 3,063,874
Patented Nov. 13, 1962

3,063,874
FILTER CLEANING SYSTEM FOR TEXTILE TRAVELING SUCTION CLEANER
Robert L. Black, Jr., Charlotte, N.C., assignor to Parks-Cramer Company, Fitchburg, Mass., a corporation of Massachusetts
Filed Apr. 24, 1961, Ser. No. 105,089
15 Claims. (Cl. 134—21)

This invention relates to the art of removing waste, such as lint, dust and other light material, from room and machine surfaces and adjacent areas in manufacturing plants; textile mills in particular. More particularly, this invention relates to traveling suction cleaning apparatus of the type movable over textile machines and the like having an improved waste collection system including a novel method and means for maintaining the filter surface of the collection chamber thereof free from collected lint and other material.

The improved waste collection chamber and filter cleaning apparatus of the present invention are particularly devised for use with overhead traveling suction cleaning apparatus of a type such as is disclosed in the co-pending United States application, Serial No. 759,797, filed September 8, 1958, entitled Traveling Suction Cleaning Apparatus, now U.S. Patent No. 3,011,202, dated December 5, 1961, and assigned to the same assignee as the present application.

The apparatus of said co-pending application comprises a suction blower movable upon a track located above a row or rows of textile machines and having one or more suction nozzles depending therefrom which move in sufficiently close proximity to the floor and/or machine surfaces to suck lint and other light material thereinto. Such material is sucked into and passes through the suction blower into a collection chamber carried by and communicating with the blowing outlet of the suction blower.

The collection chamber has a filter or foraminous screen therein through which the air from the suction blower escapes as the airborne light material is entrapped within the chamber. An open mouthed, preferably stationary, receptacle is disposed adjacent the path of travel of said chamber and, as the chamber moves into registration with the receptacle, a normally closed discharge door on the outer end of the chamber is opened so the blast of air from the blower blows the collected material into the receptacle.

Although the filter of said chamber is positioned generally parallel to the blast of air as it enters the chamber so that the blast of air from the blower continuously cleans the inside surface of the filter to some extent and to a considerably greater extent each time the collection chamber is opened and the contents thereof are discharged from the chamber by the blast of air, it has been necessary in some instances to stop the traveling cleaner and manually clean the filter from time to time whenever lint and the like has become lodged in the perforations in the filter.

It is therefore an object of this invention to provide an improved method and apparatus for cleaning the filter of a traveling cleaner of the character described in which jets or blasts of compressed air are directed inwardly through the filter and into the chamber as the chamber moves into alinement with the open mouth of the receptacle preferably while the door to the chamber is open, the jets of air serving to blow any light material which may have become lodged in the perforations of the filter into the path of the air stream from the suction blower thereby assisting in the cleaning of the filter and also assisting in the transfer of lint and other light material from the chamber into the receptacle.

It is another object of this invention to provide an improved traveling suction cleaning system of the character last described in which a suction current is produced in the receptacle substantially simultaneously with the producing of jets of compressed air which flow through the filter and into the chamber so that the collected light material is discharged through the then open door of the chamber into the receptacle and the suction in the receptacle assists in the removal of said collected lint from the chamber.

A more specific object of this invention is to provide connections between the end of the receptacle opposite from its mouth and a source of suction with normally closed valve means interposed therein, a pipe or tube connected to a source of compressed air and having a row of small air jet openings therein overlying the path of travel of the filter of said chamber, second normally closed valve means interposed between the pipe and the source of compressed air, and means for automatically opening both valve means as the chamber approaches the receptacle and for maintaining open both valve means at least during alinement of the collection chamber with the mouth of the receptacle.

Some of the objects of the invention having been stated, other objects will appear as the description proceeds, when taken in connection with the accompanying drawings, in which:

FIGURE 1 is a top plan view partially in section, showing a traveling suction cleaner mounted on a portion of an overhead track and showing a preferred embodiment of the improved stationary waste receptacle and filter cleaning system of the present invention;

FIGURE 2 is an enlarged fragmentary sectional view taken longitudinally of the movable collection chamber substantially along line 2—2 of FIGURE 1;

FIGURE 3 is an enlarged elevation with portions broken away looking in the direction of arrow 3 in FIGURE 1; and FIGURE 4 is a schematic view showing the wiring diagram and air control mechanism of the apparatus of the present invention.

Referring more specifically to the drawings and particularly to FIGURE 1 thereof, a traveling suction cleaner is generally indicated at 10, which may be of the type disclosed in said co-pending application Serial No. 759,797, now Patent No. 3,011,202, to which reference is made for a detailed description. Generally, traveling cleaner 10 comprises a suction blower having an upper or blower casing 11 within which a driven fan or impeller 12 is positioned. Fan 12 forces air to flow through an outlet portion 13 connected to upper casing 11. Outlet portion 13 is connected at its other end to the inlet end of a collection chamber 14 which receives therein the air directed into outlet portion 13.

Blower casing 11 rests upon and communicates with lower or suction casing 15 (FIGURE 3) so that fan 12 produces a suction current in suction casing 15. Air inlet ducts 16 and 17 extend from opposite sides of and communicate with suction casing 15. The inlet ducts 16, 17 have the upper ends of respective flexible tubes or sleeves 20, 21 connected to the downwardly projecting free ends thereof. The lower end of each sleeve 20, 21 may be provided with a suitable suction nozzle 22, 23 of any desired shape which is preferably positioned in close proximity to the floor F which supports the textile machines over which the traveling cleaner 10 is adapted to be moved.

Casings 11, 15 of traveling cleaner 10 are mounted on a suitable motor-driven carriage 24 having rollers 25 thereon which ride upon a trackway 26. Trackway 26 is supported by any suitable means such as posts 27, only one of which is shown in FIGURE 3. Posts 27 extend downwardly from trackway 26 to the top of a textile machine or machines 28, shown in phantom lines in FIGURE 1, or in certain instances to the floor F. Carriage 24 may be propelled along trackway 26 by means such as is disclosed in United States Patent No. 2,011,763, dated August 20, 1935, for example.

Collection chamber 14 preferably comprises a generally rectangular tubular member open at both ends and having an elongated opening in the top wall thereof. A suitable foraminous screen member or filter 30 is mounted in the opening in the top wall of collection chamber 14 for allowing the air directed thereinto by impeller 12 to escape from collection chamber 14 while retaining lint and other right material therein.

A suitable door 31 is mounted, by a hinge 32, adjacent the outer end of the lower wall of collection chamber 14 for pivotal movement to open and close the discharge or egress end thereof, which is the open end opposite from the outlet portion 13. Door 31 has suitable perforations or a suitable foraminous screen member or filter 33 mounted therein to allow the air stream to escape through the door 31 when closed, while retaining the lint and other material within the collection chamber.

Door 31 is of the normally closed type which is opened at predetermined intervals for periods of predetermined duration by a mechanism (FIGURE 3) comprising a crank arm 34 pivotally mounted on the bottom of collection chamber 14 and connected at one end to door 31 by a link 35. A link 36 connects the other end of crank arm 34 to the upper end of a crank arm 37. Crank arm 37 is pivotally mounted on casing 15 intermediate its ends and has a roller 38 mounted on the end opposite link 36. The lower end of crank arm 37 and roller 38 are positioned outwardly of trackway 26 in position to engage a cam 39 mounted thereon. Cam 39 moves roller 38 outwardly of trackway 26, pivoting cranks 37 and 34, and opening door 31. For a more detailed description of the door opening mechanism, reference is made to my co-pending application, Serial No. 65,219, filed October 26, 1960 and entitled Traveling Suction Cleaner With Auxiliary Air Inlet, now Patent No. 3,038,191.

Cam 39 is positioned along trackway 26 in a manner such that door 31 is opened when collection chamber 14 moves into alinement with the mouth of a suitable stationary receptacle 40. When door 31 is opened by the aforementioned mechanism, the blast of air from impeller 12 blows the collected lint and other material out of the collection chamber 14 and into stationary receptacle 40. Receptacle 40 comprises first and second interconnected sections 41, 42, respectively. Section 41 comprises top and bottom walls 43, 44 which are connected along their sides by curved side walls 45, 46. Walls 43, 44 converge from the medial portion of receptacle 40 toward trackway 26 to provide an inlet opening or mouth of reduced cross-sectional area relative to the medial portion of receptacle 40. The inlet opening or mouth of receptacle 40 is relatively broad or of sufficient length horizontally to insure ample time for all of the collected material to be discharged from traveling collection chamber 14, although traveling cleaner 10 may move quite rapidly past receptacle 40.

Section 42 comprises top and bottom walls 47, 48 which are connected along their sides by curved side walls 49, 50. Both top and bottom walls 47, 48 and side walls 49, 50 of section 42 converge from the medial portion of receptacle 40 away from trackway 26 to provide a discharge opening of reduced cross-sectional area relative to the medial portion of receptacle 40. The larger cross-sectional area at the medial portion of receptacle 40 allows the air stream directed thereinto to expand in the receptacle to prevent a back pressure from being built up which would interfere with the discharge of the collected material from the collection chamber.

The discharge or outer end of a receptacle 40 is connected by means of a valve mechanism 51 to a suitable duct D (FIGURE 1) connected to a suitable source of suction, not shown, and which is adapted to transport the material received within receptacle 40 to a storage station at a point spaced from the textile machines for storage until subsequently removed. Valve 51 comprises a generally rectangular tubular casing 52 which has a substantially rectangular opening therein which communicates with the discharge opening in receptacle 40 and with duct D. A pair of valve doors 53, 54 are pivotally mounted within casing 52 adjacent the ingress end of casing 52 and adjacent opposite side walls thereof. Doors 53, 54 are movable into alinement to close the casing 52 to the passage of air therethrough.

Doors 53, 54 are connected by suitable linkage 55, 56 to a cross member 57 connected to a piston 60 of a suitable air motor 61. Piston 60 is biased to a retracted position by a compression spring 62 and is moved to an extended position by compressed air being introduced into air motor 61 on the opposite side of piston 60 from spring 62.

A suitable air supply pipe 63 is connected at one end to air motor 61 and at the other end to a two-way valve 64. A pipe 65 connects valve 64 to a suitable pressure reduction valve 66 which, in turn, is connected to a suitable compressed air source, such as a compressor 67 by means of a pipe 70. An air strainer 71 may be mounted in pipe 70 between compressed air source 67 and pressure reduction valve 66 for straining any impurities from the air. Valve 64 is moved between its two positions by a solenoid 72. When solenoid 72 is energized, in a manner to be presently described, valve 64 has a passage therein which alines with pipe 63 and an opening 73 in the housing thereof allowing air to escape from air motor 61 which, in turn, allows spring 62 to move piston 60 to the retracted position opening doors 53, 54. When solenoid 72 is de-energized, valve 64 has a passage which alines with pipes 63, 65 allowing air to flow into air motor 61 and move piston 60 to the extended position which closes doors 53, 54.

A filter or foraminous screen cleaning means is generally indicated at 80 and comprises a pipe 81 mounted on the stationary receptacle 40 by suitable bracket 82. Pipe 81 extends outwardly from above the mouth of receptacle 40 toward trackway 26 to a position overlying the path of travel of filter 30 mounted in the top wall of collection chamber 14. Pipe 81 has at least one row of small jet openings 83 formed in the lower surface thereof which allow air to flow from pipe 81 downwardly through filter 30 when the same underlies pipe 81. A pipe 84 is connected at one end to pipe 81 and at the other end to a valve 85 which, in turn, is connected to pipe 71 by a pipe 86.

A solenoid 87 is connected to valve 85 and operates, when energized, to move valve 85 to a position wherein a passage therein alines with pipes 84, 86 to allow air to flow therethrough into pipe 81 and outwardly through openings 83 in the form of high velocity jets. When de-energized, solenoid 87 moves valve 85 to the position wherein the passage is out of alinement with pipes 84, 86 and consequently the flow of air therethrough is stopped. It should be noted that pipe 81 communicates with compressed air source 67 directly through valve 85, while air motor 61 communicates with compressed air source 67 through reducing or regulator valve 66. Thus, high line pressure may be admitted to pipe 81 while a relatively low pressure may be admitted to air motor 61 to prevent damage to the air motor from the high pressure at the source 67.

A control circuit is provided for controlling the operation of the door opening means and the filter cleaning means and comprises a male plug 90 which is adapted to be connected to a suitable source of electrical energy, not shown. A power line 91 and ground line 92 are connected to male plug 90 and to solenoids 72 and 87. Solenoids 72, 87 may be in series to insure simultaneous action thereof. A unidirectional switch 93 is mounted on trackway 26 and is connected in power line 91. A feeler arm 94 is mounted on switch 93 and extends upwardly therefrom to a point spaced upwardly of and outwardly from trackway 26. Feeler arm 94 is suitably biased to the upright position by a leaf spring 94a which is mounted on switch 93 and engages a suitable cam surface on the bottom of feeler arm 94. An extension 95 is mounted on and extends outwardly from one of the wheels 25 of carriage 24 for movement therewith and is adapted to engage feeler arm 94 which, in turn, closes switch 93. When closed, switch 93 completes an electrical circuit through lines 91, 92 to solenoids 72, 87 which energizes the same.

Switch 93 is suitably positioned on trackway 26 rearwardly of receptacle 40 and filter cleaner 80 relative to the direction of travel of suction cleaner 10 such that doors 53, 54 will be opened and air will be escaping through openings 83 in pipe 81 when collection chamber 14 arrives in alinement with the mouth of receptacle 40 and when filter 30 arrives beneath pipe 81. The prior opening of doors 53, 54 insures that the discharge of the collected material from collection chamber 14 takes place smoothly without any back pressure being built up in receptacle 40. This also allows time for a maximum build-up of inward air flow into receptacle 40 under influence of the continuous negative or suction pressure present in pipe D.

The prior actuation of filter cleaner 80 insures that the entire surface of filter 30 is subjected to the blowing air currents from pipe 81 so that any accumulation of lint and the like is removed from the entire surface. Also, this actuation insures that the air currents are directed into collection chamber 14 at the time door 31 is opened so that the volume of air passing through collection chamber 14 is at its maximum for the initial discharge of the collected material from collection chamber 14 into receptacle 40.

Since switch 93 is unidirectional, it will be closed only when suction cleaner 10 is traveling in a particular direction. If it is desired to have suction cleaner 10 travel in the opposite direction, another switch 93a (FIGURE 1), which is unidirectional for closure in a direction opposite to switch 93, may be provided on trackway 26 on the opposite side of receptacle 40 from switch 93.

A suitable timing mechanism 96 (FIGURE 3) is connected in series in lines 91 and 92 for maintaining solenoids 72, 87 energized for a sufficient length of time to allow collection chamber 14 to move from initial alinement with receptacle 40 to a position out of alinement therewith. When the collection chamber 14 moves out of alinement with the mouth of receptacle 40, timer 96 will de-energize solenoids 72, 87 by breaking the circuit thereto and allowing doors 53, 54 to close and valve 85 to shut off the flow of air through pipe 81 and out of openings 83. Since timing devices such as proposed to be used in the above described apparatus are well known in the art, a detailed description thereof is deemed unnecessary. Reference is made to FIGURE 8 of Patent No. 2,751,621, wherein a timing mechanism of the type preferably to be used herein is shown, although any suitable instant-make time-delay-relay mechanism may be used.

In operation, traveling suction cleaner 10 is moved over trackway 26 in the manner described. Impeller 12 draws an air stream laden with lint, dust and other material through nozzles 22, 23 upwardly through tubes 20, 21 and into inlet ducts 16 and 17. Suction casing 15 receives the air stream and material carried thereby from inlet ducts 16, 17 and transmits the same to blower casing 11. Impeller 12 discharges the air stream and material carried thereby outwardly through outlet portion 13 into collection chamber 14. The air stream escapes from collection chamber 14 through filters 30, 33 while the lint and other material is retained within collection chamber 14.

It is noted that the air stream enters the collection chamber in a manner such that it passes filter or foraminous screen 30 parallel thereto and aids in keeping lint and other material from collecting on the inside surface thereof and clogging the openings thereof which would reduce the area which will allow the air stream to escape therefrom.

At a predetermined point or points along the path of travel of traveling suction cleaner 10, collection chamber 14 moves into alinement with the mouth of stationary receptacle 40. At this time, door 31 is opened by cam 39, cam follower or roller 39 and the linkage connecting the same to door 31, allowing the blast of air from impeller 12 to discharge the collected material outwardly of collection chamber 14 through the egress opening therein and into the mouth of stationary receptacle 40. Stationary receptacle 40 is so constructed that as the air stream and collected material move into the mouth thereof, the inside cross-sectional area rapidly increases thus overcoming any tendency toward pressure build up which would retard prompt transfer of material into suction pipe D.

Prior to the arrival of collection chamber 14 in alinement with the mouth of receptacle 40, switch 93 is closed by extension 95 and feeler arm 94 to energize solenoids 72, 87. When energized, solenoid 72 moves valve 64 to a position wherein the air is exhausted from air motor 61 allowing compression spring 62 to move piston 60 to the retracted position which, through the linkage 55 through 57, opens doors 53, 54 and completes an open passageway from the mouth of receptacle 40 through valve mechanism 51 to duct 50. As heretofore stated, a suitable suction means applies suction to duct 50 and to the receptacle 40 when doors 53, 54 are open for transfer of the collected material to a storage station spaced from the textile machines. When energized, solenoid 87 moves valve 85 to open position, allowing air to flow from compressed air source 67 through pipe 70, strainer 71, pipe 86, valve 85, and pipe 84 into pipe 81 and outwardly through openings 83.

Collection chamber 14 moves into position underlying pipe 81 such that filter 30 moves under openings 83 in pipe 81 so that the compressed air escaping through openings 83 is directed downwardly through filter 30 and serves to remove any collected lint and other material, which has not previously been removed by the air stream from impeller 12, from the inside surface thereof to restore the filter or screen to proper operating condition so that the air stream may readily escape from collection chamber 14. Timer 95 maintains solenoids 72, 87 energized for a sufficient length of time to allow collection chamber 14 to move completely across the open mouth of receptacle 40 so that sufficient time is given for the collected material to be exhausted or discharged from collection chamber 14 into receptacle 40.

It will therefore be apparent that an improved traveling suction cleaning apparatus is provided wherein the filter or foraminous screen mounted in the collection chamber is periodically freed of collected lint or other material so that the air stream may readily escape therethrough, thus increasing the efficiency of the apparatus. The filter or foraminous screen cleaning means supplies an additional volume of air through the collection chamber to provide a more efficient discharge of the collected material from the collection chamber into the stationary receptacle. Still further, improved means is provided for closing and opening the doors between the receptacle and the duct connected thereto which operates in proper time cycle with the operation of the filter cleaning mechanism to provide a more efficient transfer of the collected material from the collection chamber to the spaced storage station.

In the drawings and specification there has been set forth a preferred embodiment of the invention, and although specific terms are employed, they are used in a generic and descriptive sense only and not for purposes of limitation, the scope of the invention being defined in the claims.

I claim:

1. In a traveling suction cleaning apparatus of the type having a suction blower adapted to be moved over textile machines and the like including a material collection chamber with perforate means for allowing air to escape while retaining lint and other light material therein, means positioned independently of the suction blower and the collection chamber for periodically directing jets of air into said collection chamber through said perforate means for removing collected lint and other material from the inside surface of said perforate means.

2. In a traveling suction cleaning apparatus having suction blower means for removing lint, dust and other light material from a surface to be cleaned by suction, a material collection chamber for collecting the lint, dust and other light material therein, filter means mounted in said collection chamber for allowing air to escape therefrom while retaining the lint and other light material therein, receptacle means positioned at a predetermined point along the path of travel of said traveling suction cleaning apparatus for receiving collected material from said collection chamber, and means for opening said chamber to empty material therefrom into said receptacle; in combination therewith, means positioned independently of the suction blower means and the chamber for periodically directing jets of air into said collection chamber through said filter means for removing collected lint and other material from the inside surface of said filter means while aiding in emptying the collected material from the collection chamber into the receptacle.

3. The structure set forth in claim 2, wherein said means for directing air jets comprises a pipe mounted adjacent the path of travel of the collection chamber and having openings in the side facing said filter means and in an area disposed opposite the same, said pipe being connected to a compressed air source for delivering air under pressure to said pipe.

4. In a traveling suction cleaning apparatus of the type adapted to be moved over textile machines and the like including means for removing lint, dust and other light material from the surface to be cleaned by suction, a material collection chamber for receipt of the material so removed, filter means positioned in said collection chamber for allowing air to escape while retaining the lint and other light material in said chamber, and a receptacle mounted adjacent the path of travel of said collection chamber for receipt of the collected material therefrom; in combination therewith, a pipe connected to a source of compressed air and mounted adjacent the path of travel of said filter means in said collection chamber, said pipe having openings therein in the side facing said filter means and in the area disposed immediately opposite the filter means, whereby said pipe directs air under pressure into the collection chamber through said filter means for aiding in the removal of any collected lint and other material on the inside surface of said filter means, and valve means mounted in said pipe between said air source and said openings for controlling the delivery of air to said openings.

5. In an overhead, track mounted traveling suction cleaner for textile mills having a suction blower, at least one suction nozzle connected to the suction side of said suction blower and adapted to move in sufficiently close proximity to surfaces to be cleaned to suck lint and other light material thereinto, a collection chamber connected to the blowing side of said suction blower for receiving and collecting said material therein, a filter means in said chamber for entrapping said material thereagainst while permitting the air from the suction blower to escape therethrough, normally closed door means on said chamber, an open-mouthed receptacle disposed adjacent the path of travel of said chamber, and means for opening said door means as the chamber moves adjacent said receptacle for transferring collected material from said chamber to said receptacle; the combination of normally inactive air jets discharging means adjacent said receptacle for directing jets of air through said filter means into said chamber, and means under control of said traveling cleaner for rendering active said air jet discharging means during movement of said chamber adjacent said receptacle.

6. A structure according to claim 5 in which said receptacle is connected to a source of suction, normally closed valve means interposed between said receptacle and said source of suction, and said means under control of said traveling cleaner being operatively connected to said valve means for opening the same while said air jet discharging means is active.

7. A structure according to claim 6, including timing means operable upon actuation of said means under control of said traveling cleaner for maintaining said valve means in opening position for a predetermined length of time and for closing said valve means at the end of said predetermined length of time.

8. In a traveling suction cleaning apparatus of the type adapted to be moved over textile machines and the like for removing lint, dust and other light material from machine and room surfaces and having a collection chamber for collecting the lint and other light material, filter means positioned in said collection chamber for allowing air to escape while retaining the lint and other light material in said chamber, a receptacle mounted adjacent the path of travel of said collection chamber and adapted to receive the collected material from said collection chamber, and suction means for applying suction to said receptacle; in combination therewith, means positioned adjacent the path of travel of said filter means for directing currents of air into said collection chamber through said filter means for removing accumulations of lint and other light material from the inside surface of said filter means, means positioned between said receptacle and said suction means for interrupting the application of suction to said receptacle, and control means operable upon the approach of said collection chamber into alinement with said receptacle for actuating said air current directing means and for removing said interrupting means.

9. In a traveling suction cleaning apparatus of the type adapted to be moved over textile machines and the like for removing lint, dust and other light material from machine and room surfaces and having a collection chamber for collecting the lint and other light material, filter means positioned in said collection chamber for allowing air to escape while retaining the lint and other light material in said chamber, a receptacle mounted adjacent the path of travel of said collection chamber and adapted to receive the collected material from said collection chamber, and means for applying suction to said receptacle; in combination therewith, a pipe connected to a source of compressed air mounted adjacent the path of travel of said filter means, said pipe having openings therein, said openings serving to direct current of air into said collection chamber through said filter means for removing accumulations of lint and other material from the inside surface of said filter means, valve means positioned in said pipe between said source and said openings for controlling the delivery of air to said openings, means positioned between said receptacle and said suction means for interrupting the application of suction to said receptacle, and control means operable upon the approach of said collection chamber into alinement with said receptacle for opening said valve means and for removing said interrupting means.

10. The structure set forth in claim 9, wherein said interrupting means comprises a duct interconnecting the end of said receptacle opposite said collection chamber and said suction means, a pair of doors mounted in said duct for movement between open and closed positions, an air motor having a piston connected to said doors for moving the same to closed position, means including a control valve connecting said air motor to said source of compressed air for delivering compressed air thereto, and a spring connected to said piston for moving said doors to open position, said control means when operable serving to close said valve for exhausting air from said motor to allow the spring to open the doors.

11. A method of cleaning machine and room surfaces in manufacturing plants, particularly textile mills, comprising the steps of removing lint, dust and other material therefrom by traveling suction, collecting the removed material in a traveling collection chamber, allowing air to escape from the chamber through a filter while retaining the lint and other material therein, periodically discharging the collected material from the chamber into a receptacle, and moving the chamber past high velocity jets of compressed air while directing the jets of air into the chamber through the filter as the collected material is being discharged from the collection chamber to aid in the removal of collected lint and other material from the inside surface of the filter and to aid in the discharge of the collected material from the collection chamber.

12. In a method of removing and disposing of accumulations of lint and the like from machine and room surfaces in a textile mill having a row of textile machines therein; the steps of causing a stream of air to flow into a nozzle by suction, moving the nozzle in a predetermined path of travel closely adjacent the machine and room surfaces substantially longitudinally of and adjacent at least one side of said row of textile machines, collecting the lint drawn into the nozzle in a chamber moving with the suction nozzle, while permitting air to escape through a filter in said chamber, automatically opening the chamber at predetermined intervals and emptying the lint from the collection chamber, and moving the chamber past relatively small, high velocity jets of air under pressure while directing the jets of air inwardly through said filter for at least a part of each interval during which said chamber is open.

13. A method of cleaning the room and machine surfaces in a room having a plurality of rows of textile machines therein which comprises moving a blower longitudinally of and above at least one row of said machines while utilizing the inlet of the blower to produce suction currents in a nozzle movable with the blower in close proximity to surfaces to be cleaned and while utilizing the outlet of the blower for conveying the material picked up by the nozzle into a collection chamber moving with the blower, passing the air from the outlet of the blower through a filter in said chamber, and periodically opening the chamber to discharge the collected material therefrom while moving the filter past a plurality of jets of compressed air which pass inwardly through said filter to clean the same and aid in the discharge of the collected material from said chamber.

14. A method of disposing of lint and the like in a room having a plurality of textile machines therein which comprises producing a suction current closely adjacent surfaces to be cleaned adjacent said machines, while moving said suction current generally longitudinally of an aisle adjacent said machines, utilizing said current for conveying lint and the like sucked from the floor into a traveling collection chamber, utilizing a filter in said chamber for retaining the lint and the like in the chamber as the air escapes from the chamber, moving said collection chamber into registration with a stationary receptacle, transferring the lint and the like from the traveling collection chamber into the stationary receptacle, and moving the chamber past jets of compressed air while directing the jets of air inwardly through said filter and into the chamber and while creating a suction current within said receptacle to aid in transferring the material into the receptacle and to aid in cleaning the filter.

15. The method of removing and collecting lint and other light material from the floor of a room containing a textile processing machine, which comprises producing at least one suction current of air adjacent the floor, automatically and repeatedly moving the suction current of air in a predetermined path lengthwise of and adjacent to the textile processing machine, conveying material sucked into the suction air current upwardly from adjacent the floor to a zone above the level of the machine, collecting the material in a chamber traveling with said current and having a filter through which the air passes while the material is retained in the chamber, producing at least one blowing current of air independently of said suction current of air and at a zone adjacent the path of travel of the filter, and directing said blowing current of air against the outside surface of the filter and through the same so as to remove material from the inside surface of the filter.

References Cited in the file of this patent

UNITED STATES PATENTS 2,976,558    Fain _____ Mar. 28, 1961

FOREIGN PATENTS 797,940    Great Britain _____ July 9, 1958

OTHER REFERENCES

Parks-Cramer Bulletin No. 415, published Sept. 14, 1959.